Patented June 19, 1951

2,557,806

UNITED STATES PATENT OFFICE 2,557,806

PROCESS OF PREPARING BETA-SUBSTITUTED POLYMETHINE DYESTUFFS

Leo Arnold Van de Straete, Mortsel-Antwerp, and Marcel Adam Schouwenaars, Edegem-Antwerp, Belgium, assignors to Gevaert Photo-Producten N. V., Mortsel-Antwerp, Belgium, a company of Belgium No Drawing. Application June 17, 1947, Serial No. 755,228. In Germany August 21, 1943

Section 1, Public Law 690, August 8, 1946
Patent expires August 21, 1963

4 Claims. (Cl. 260—240.65)

This invention relates to polymethine dyestuffs having in the $\beta$ position in the polymethine chain a substituent, such as alkyl, substituted alkyl or aryl mercapto, seleno alkyl or substituted alkyl, alkoxyl or substituted alkoxyl or residues obtained by subtracting an H atom from, for instance, 2-mercaptobenzothiazole, thioglycolic acid or dihydrohindole.

By "$\beta$ position" in the polymethine chain, the second carbon atom of the chain near one of the heterocyclic nuclei is understood, accents being used to distinguish the nuclei.

It is known to prepare symmetrical and unsymmetrical meso-substituted carbocyanines by causing intermediate substances of the general formula

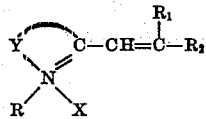

wherein $R_1$ is S-alkyl, S-substituted alkyl, S-phenyl, Se-alkyl, Se-substituted alkyl, halogen, and $R_2$ is alkyl to react with quaternary cyclammonium salts containing a reactive methyl group. The carbocyanine is formed by condensation of the reactive methyl group with the $R_1$ group.

Symmetrical and unsymmetrical trimethine-meso-thio-alkyl-carbocyanines may be prepared by the action of compounds of the general formula

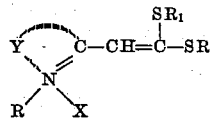

wherein R and R' are alkyl, aralkyl on quaternary cyclammonium salts containing a reactive methyl group.

Symmetrical meso-substituted carbocyanines may also be prepared by condensing quaternary cyclammonium salts containing a reactive methyl group with compounds corresponding to the formula

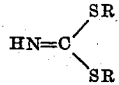

wherein R is alkyl, aryl, aralkyl, and N may be replaced by alkyl or aryl.

It is among the objects of our invention to provide new polycarbocyanine dyestuffs. Other objects of this invention center about the provision of new styryl dyestuffs and new mero-dicarbocyanine dyestuffs. A further object of this invention is to provide a new process for preparing $\beta$-substituted polymethine dyestuffs.

To accomplish the foregoing objects and others which will hereinafter appear, our invention resides in the product and the method of producing same, as are more particularly described in the following specification and sought to be defined in the appended claims.

According to our invention, symmetrical or unsymmetrical $\beta$-substituted polymethine dyestuffs are prepared by condensing intermediate substances, corresponding to the general formula

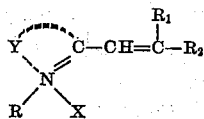

wherein R represents alkyl, aralkyl, aryl, carboxyalkyl or a substituted or non-substituted trimethylene bridge, the one end of which is linked to the peri C atom of the nucleus completed by Y, $R_1$ represents S-alkyl, S-aryl, S-substituted alkyl, Se-alkyl, Se-substituted alkyl, O-alkyl, O-substituted alkyl or radicles obtained by substitution for halogen in the $R_1$ position, for instance, 2 - mercaptobenzothiazole, thioglycolic acid, dihydroindole, etc., $R_2$ represents a methyl group, Y is the nonmetallic atoms necessary to complete a five or six membered heterocyclic ring which occasionally forms part of a ring system, and X is an acid residue, with a cyclammonium salt, an intermediate substance or an aldehyde usable in the cyanine chemistry and containing a group which reacts with the CH3 group.

The method of the present invention depends on the strong increase of the reactivity of the CH3 group caused by the presence of one of the atom group represented by $R_1$ linked with the same carbon atom. This increase was the more surprising as 2-propenylbenzoxazole (wherein $R_1$ is hydrogen) prepared according to Döller (Ber. 73 (1939) 2148) does not form polymethine dyestuffs with said quaterary salts or intermediate substances.

Suitable intermediate substances corresponding to the formula

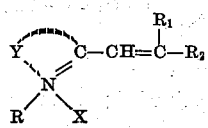

which may be used for the condensation are, e. g.: 2-(2-methylmercapto-propenyl)-benzothiazole ethyl methyl sulphate

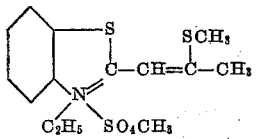

2-(2-methylmercapto-propenyl)-β-naphtothiazole ethyl methyl sulphate

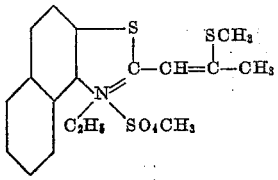

2-(2-methylmercapto-propenyl)-3-4-trimethylene-benzothiazole methyl sulphate

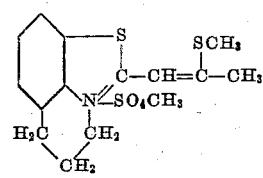

2-(2-benzylmercapto-propenyl)-benzothiazole ethyl bromide

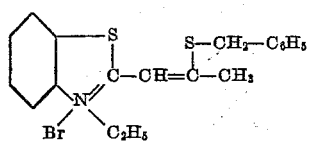

2-(2-carboxyethylene-mercapto-propenyl)-benzothiazole ethyl chloride

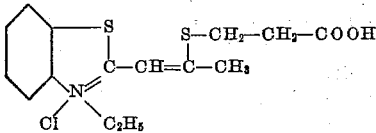

2-(2-seleno-methyl-propenyl)-benzothiazole ethyl methyl sulphate

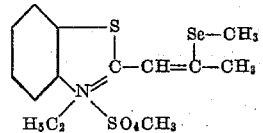

2-(2-methoxy-propenyl)-benzothiazole ethyl iodide

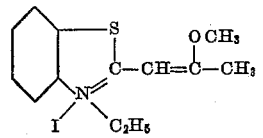

2-(2-phenylmercapto-propenyl)-benzothiazole ethyl chloride

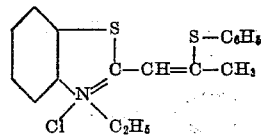

The latter is obtained by causing 2-(2-chloropropenyl)-benzothiazole ethyl chloride

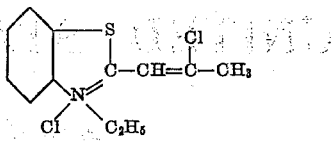

to react with an alcoholic solution of sodium thiophenolate ($C_6H_5$—SNa). After an hour boiling, the formed intermediate substance can be precipitated with ether.

According to the nature of the products reacted with these intermediate substances, the resulting condensation products are carbocyanines, dicarbocyanines, tricarbocyanines, etc., styryl dyestuffs or mero-dicarbocyanines.

Due to the numerous possibilities of variation, our new process enables the production of a large number of polymethine dyestuffs, most of which could not be prepared yet until now.

In the following description, by way of example, special methods of preparing the different polymethine dyes according to the invention are explained. It is, however, possible to prepare the same dyes with the help of other intermediates containing a group able to react with the methyl group.

PREPARATION OF CARBOCYANINES

Carbocyanines may be prepared according to the following general reaction

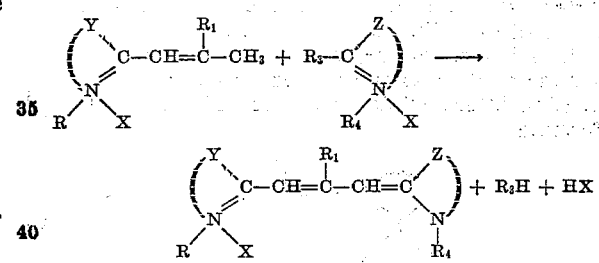

wherein $R_1$ is S-alkyl, S-aryl, S-substituted alkyl, Se-alkyl, Se-substituted alkyl, O-alkyl, O-substituted alkyl, or radicles obtained by substituting for halogen in the $R_1$ position, for instance, 2-mercaptobenzothiazole, thioglycolic acid, dihydroindole, etc., $R_3$ is $SCH_3$, $SC_6H_5$, $SCH_2C_6H_5$, $SeCH_3$, $SeC_6H_5$, $SeCH_2C_6H_5$, halogen, etc.

R and $R_4$ are alkyl, aralkyl, aryl, carboxyalkyl (instead of the usual quaternation a substituted or non-substituted bridge may be arranged between N and the peri C atom;

R and $R_4$ are identical or different,

X is an acid residue,

Y and Z are the non-metallic atoms necessary to complete a five or six membered heterocyclic ring which occasionally forms part of a ring system whereby Y and Z are identical or different.

*Example 1*

1.8 gr. of 2-(2-methylmercaptopropenyl)-benzothiazole ethyl methyl sulphate of the probable structure

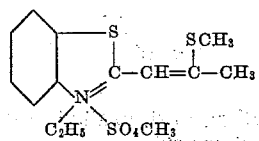

and 1.9 gr. 2-methylmercaptobenzothiazole ethyl para-toluene sulphonate are dissolved in 15 cm.³ pyridine and boiled for two to three minutes with 3 cm.³ triethylamine. After treating the reaction mixture with an aqueous sodium perchlorate solution, a dyestuff of the probable structure

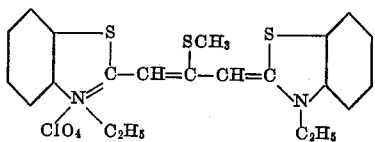

crystallises out.

*Example 2*

2.05 gr. 2-(2-methylmercaptopropenyl)-β-naphthothiazole ethyl methyl sulphate and 1.9 gr. 2-methylmercaptobenzothiazole ethyl-p-toluene sulphonate are dissolved in 15 cm.³ pyridine. Next 3 cm.³ triethylamine are added and the mixture is boiled for 2 minutes. After addition of an aqueous sodium perchlorate solution, a dyestuff of the probable structure

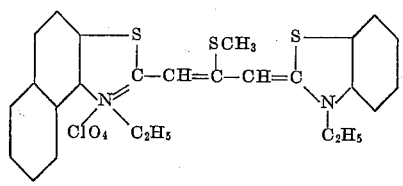

crystallises out.

*Example 3*

A carbocyanine of the structure according to

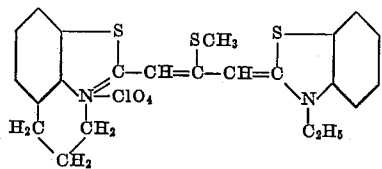

is obtained in a way analogous to the foregoing examples from a mixture of 500 mg. 2-(2-methylmercaptopropenyl)-3-4-trimethylene-benzothiazole methyl sulphate, 500 mg. 2-methylmercaptobenzothiazole ethyl-p-toluene sulphonate, 1 cm.³ triethylamine and 10 cm.³ pyridine.

*Example 4*

1.8 gr. of the intermediate substance of Example 1 and 2.05 gr. 2-iodoquinoline ethiodide are dissolved at boiling temperature in 225 cm.³ absolute ethyl alcohol. After adding 3 cm.³ triethylamine, the mixture is boiled for 2 hours, whereafter an aqueous sodium perchlorate solution is added. A dyestuff of the structure according to

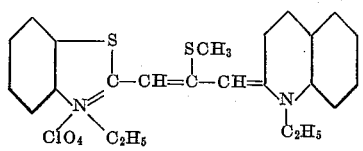

is obtained.

*Example 5*

1.3 gr. 2-(2 - benzylmercaptopropenyl) - benzothiazole ethyl bromide of the structure according to

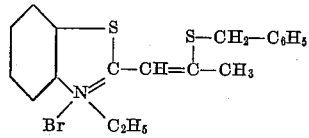

and 1.2 gr. 2-methylmercaptobenzothiazole ethyl para-toluene sulphonate are dissolved in 30 cm.³ absolute ethyl alcohol. Next 2 cm.³ triethylamine are added and the mixture is boiled for one minute. After treating with sodium perchlorate, a carbocyanine of the structure according to

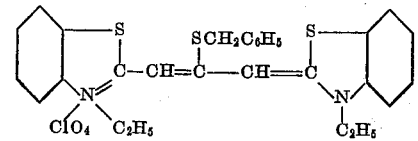

crystallises out.

*Example 6*

1.2 gr. 2-(2-carboxyethylene-mercapto-propenyl)-benzothiazole ethyl chloride of the probable structure according to

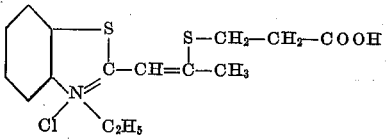

and 1.3 gr. 2-methyl-mercaptobenzothiazole ethyl p-toluene sulphonate are dissolved in 30 cm.³ ethyl alcohol and heated up to boiling temperature. Next 2.5 cm.³ triethylamine are added and the mixture is boiled for 2 minutes. After addition of a 20 per cent aqueous sodium perchlorate solution and keeping for 24 hours, a dyestuff of the probable structure of

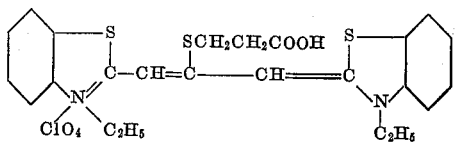

is obtained.

*Example 7*

A dyestuff of the probable structure according to

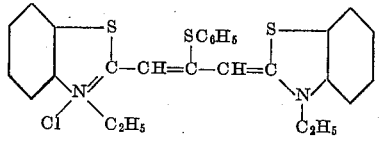

is obtained by causing 1 mol 2-(2-phenylmercapto-propenyl)-benzothiazole ethyl chloride according to

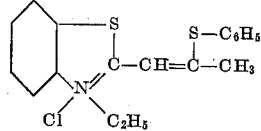

to react with 1 mol 2-methyl-mercapto-benzothiazole ethyl p-toluene sulphonate in alcohol and triethylamine.

*Example 8*

1.3 gr. 2-(2-seleno-methyl-propenyl) benzothiazole ethyl methyl sulphate according to

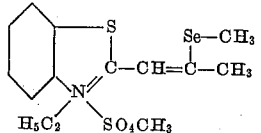

and 1.27 gr. 2-methylmercapto-benzothiazole ethyl p-toluene sulphonate are dissolved in 40 cm.³ ethyl alcohol and heated up to boiling temperature. Next 2 cm.³ triethylamine are added and the mixture is lightly heated on the water bath for 5 minutes. After over-night keeping, a little dyestuff crystallises out. This by-product is eliminated by filtration. The filtrate is heated once again whereafter an aqueous potassium iodide solution and a little ice are successively added. Thus a dyestuff of the probable structure according to

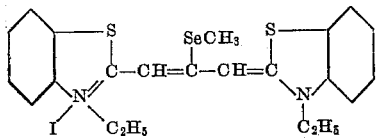

is obtained. It may be purified by crystallisation.

Example 9

2-acetylmethylene-N-ethyl-benzothiazoline is treated in a benzene solution with an equimolecular quantity of methiodide. Thus a crystalline precipitate is formed by the probable structure according to

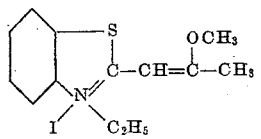

1 mol of this product and 1 mol of 2-methylmercaptobenzothiazole ethyl p-toluene sulphonate are dissolved in alcohol. 1 mol of triethylamine is added dropwise and the mixture is boiled for a few minutes. After addition of an aqueous sodium perchlorate solution, a dyestuff of the probable structure according to

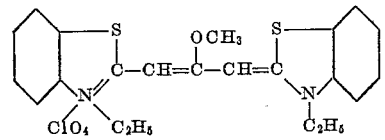

is produced.

Example 10

The intermediate substance of Example 9 is mixed in absolute alcohol with an equimolecular quantity of 2-5-dimethylmercaptothiodiazole methiodide. 1 mol triethylamine is added dropwise and the mixture is boiled for a few minutes. After addition of an aqueous sodium perchlorate solution, a dyestuff of the probable structure

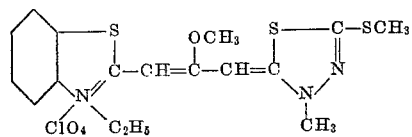

is obtained.

In comparison with the first mentioned known process using quaternary cyclammonium salts containing a reactive methyl group, our new process offers more possibilities. Besides, symmetrical and unsymmetrical meso-alkyl-mercapto-carbocyanines, other symmetrical and unsymmetrical carbocyanines containing in meso position S-aryl, S-aralkyl, Se-alkyl, Se-aralkyl, O-alkyl or the other groups represented by $R_1$ may be obtained.

The reactions produce good yield and do not give rise to the formation of secondary dyestuffs as described in the processes above referred to.

PREPARATION OF DICARBOCYANINES, TRICARBOCYANINES, ETC.

(A) The intermediate substance

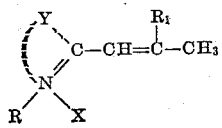

gives with an anilido or acetanilidovinyl intermediate substance a dicarbocyanine, etc. substituted in the chain by $R_1$

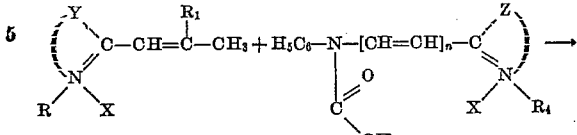

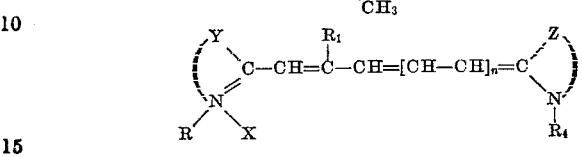

(B) The same starting substance as used in (A) gives with a 2-formylmethylene or an alkylated thio or seleno-formylmethylene intermediate substance a dicarbocyanine substituted in the chain by $R_1$

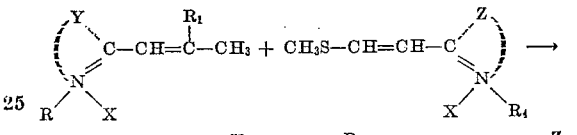

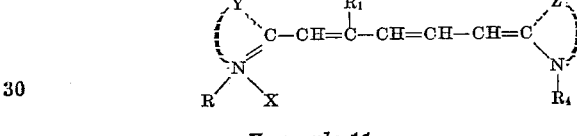

Example 11

1.4 gr. 2-acetanilidovinyl-benzothiazole dimethyl sulphate and 1.2 gr. 2-(2-methylmercapto-propenyl)-benzothiazole ethyl methyl sulphate

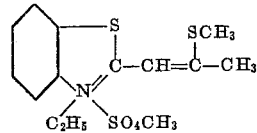

are dissolved in 50 cm.³ boiling acetic anhydride. Next 300 mg. sodium acetate are added to the warm solution and the mixture is thoroughly shaken for a few minutes. Sodium aceate is filtered off and ether is added to the filtrate. The dyestuff thus obtained is dissolved in ethyl alcohol and precipitated with an aqueous potassium iodide solution. The impure dyestuff is dissolved once again in cold ethyl alcohol, and this solution concentrated in the vacuum to half its volume. The next day a precipitate of impure dicarbocyanine is obtained. By treating the new filtrate in the same way, a pure dyestuff of the probable structure according to

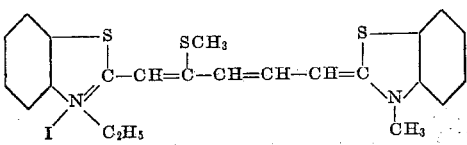

is obtained. Absorption maximum in ethyl alcohol is 690 m$\mu$.

PREPARATION OF STYRYL DYESTUFFS

The intermediate substance

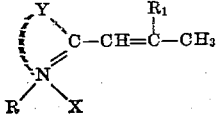

gives with substituted or not substituted aldehydes styryl dyestuffs with a substituent $R_1$ in the polymethine chain

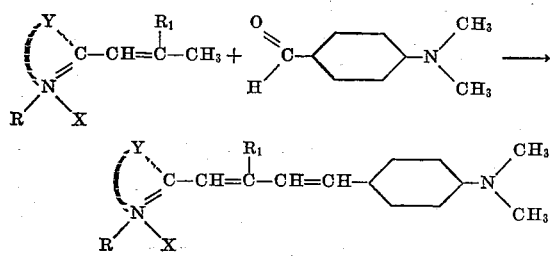

*Example 12*

2.4 gr. of the intermediate substance according to

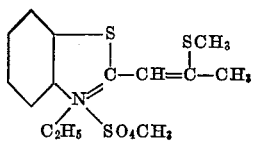

and 1 gr. p-dimethyl-amino-benzaldehyde are dissolved in 25 cm.³ acetic anhydride and boiled. The dyestuff obtained is precipitated with an aqueous potassium iodide solution, washed and repeatedly recrystallised from ethyl alcohol. The thus obtained styryl dyestuff has the probable structure according to

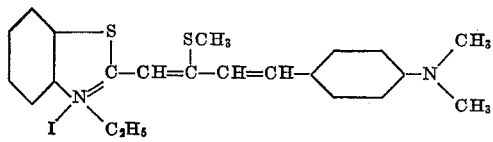

PREPARATION OF MERODICARBOCYANINES

The intermediate substance

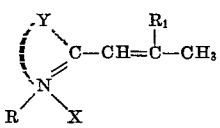

gives with an anilidomethylene derivative of a heterocyclic nucleus containing a reactive cyclo methylene group a merodicarbocyanine.

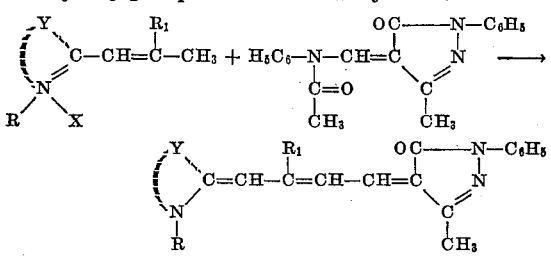

*Example 13*

A merodicarbocyanine of the probable structure according to

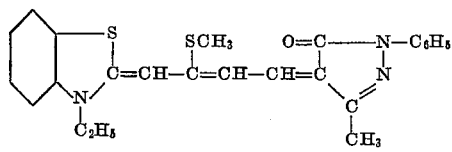

may be obtained from 1 mol of the intermediate substance according to the following formula

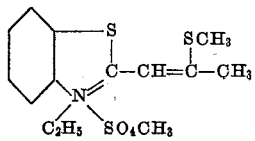

and 1 mol of 4-anilidomethylene-N-phenyl-3-methyl-5-pyrazolone in acetic anhydride in the presence of sodium acetate.

Most of these dyestuffs may be used among others as photographic sensitizers.

It is believed that the general method and the specific examples of our invention, as well as the advantages thereof, will be apparent from the foregoing detailed description. It will also be apparent that while we have shown and described preferred examples of our invention, changes may be made without departing from the spirit of the invention, as sought to be defined in the following claims.

We claim:

1. A process for preparing a carbocyanine dye containing a substituted mercapto group in the meso position, which comprises condensing, in the presence of a tertiary amino acid binding agent, a compound of the following formula

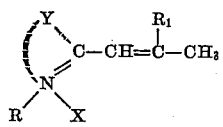

wherein X represents an anion, R represents an alkyl group, $R_1$ represents a member selected from the group consisting of S-alkyl, S-aryl, S-aralkyl and S-carboxyalkyl, Y represents the non-metallic atoms necessary to complete a five membered heterocyclic ring usual in the cyanine dye art, with a compound of the following formula

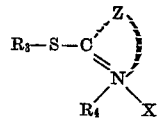

wherein X represents an anion, Z represents the non-metallic atoms necessary to complete a five membered heterocyclic nucleus usual in the cyanine dye art, $R_4$ represents an alkyl group and $R_3$ represents a member selected from the group consisting of alkyl and aryl groups.

2. A process for preparing a symmetrical beta substituted carbocyanine dyestuff of the formula

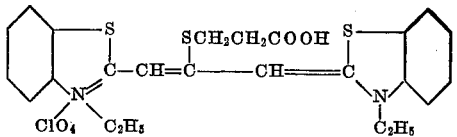

which comprises causing 2-(2-carboxyethylene-mercapto-propenyl)-benzothiazole ethyl chloride to react with 2-methyl mercapto benzothiazole ethyl-p-toluene sulphonate, and adding an aqueous solution of sodium perchlorate.

3. A process for preparing a symmetrical beta substituted carbocyanine dyestuff of the formula

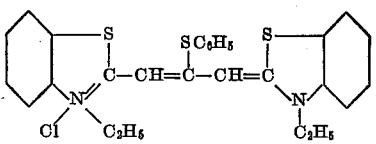

which comprises causing 2-(2-phenylmercapto-propenyl)-benzothiazole ethyl chloride to react with 2-methylmercapto-benzo-thiazole ethyl-p-toluene sulphonate.

4. A process for preparing an unsymmetrical beta-substituted carbocyanine dyestuff of the formula

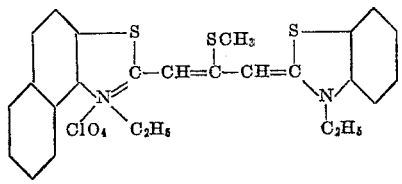

which comprises causing 2-(2-methylmercapto-propenyl)-β-naphto-thiazole ethyl methyl sulphate to react with 2-methylmercapto-benzothiazole ethyl-p-toluene sulphate and adding an aqueous solution of sodium perchlorate.

LEO ARNOLD VAN DE STRAETE.
MARCEL ADAM SCHOUWENAARS.

REFERENCES CITED

The following references are of record in the file of this patent:

UNITED STATES PATENTS

| Number | Name | Date |
| --- | --- | --- |
| 2,156,464 | Schulz | May 2, 1939 |
| 2,315,498 | Brooker | Apr. 3, 1943 |
| 2,319,547 | Kendall | May 18, 1943 |
| 2,397,013 | Kendall | Mar. 19, 1946 |
| 2,397,014 | Kendall | Mar. 19, 1946 |
| 2,425,772 | Wilson | Aug. 19, 1947 |

FOREIGN PATENTS

| Number | Country | Date |
| --- | --- | --- |
| 553,143 | Great Britain | May 10, 1943 |